3,707,385
METHOD OF PRODUCING FLAME AND FIRE RESISTANT COMPOSITIONS CONTAINING SILICEOUS MATERIALS

Stefan Kraemer, Essen, and Alois Seidl, Thurnstein, Germany, assignors to Wasag Chemie GmbH, Munich, Germany
No Drawing. Continuation-in-part of abandoned application Ser. No. 801,759, Feb. 24, 1969. This application Apr. 2, 1971, Ser. No. 130,775
Claims priority, application Germany, Mar. 6, 1968, P 16 96 636.2
Int. Cl. C09d 5/14, 5/16; C09k 3/28
U.S. Cl. 106—15 FP                                   12 Claims

ABSTRACT OF THE DISCLOSURE

A method for producing coating compositions having fireproofing agents and paint binders is accomplished by forming a solution containing alkali metal silicate, inorganic fibrous silicate, or finely powdered silicate, and water, and heating the solution to drive off the free water phase and forming a dried mixture comprising a fireproofing agent. A foaming agent may also be added to the solution. The fireproofing agents are preferably comminuted to a size below 1 mm., preferably between 1 and 50$\mu$ and are then mixed as a filler with paint and mortar binders.

CROSS-REFERENCE TO RELATED APPLICATIONS

The present application is a continuation-in-part of application Ser. No. 801,759, filed Feb. 24, 1969, now abandoned, wherein applicants claim priority under 35 U.S.C. 119 for application Ser. No. P 16 96 636.2, filed Mar. 6, 1968, in the Patent Office of the Federal Republic of Germany.

BACKGROUND OF THE INVENTION

The field of the invention is coating compositions with fireproofing agents and paint binders.

The state of the prior art may be ascertained by reference to U.S. Pats. 3,184,371 and 3,261,894 of Alois Seidl, who is a coinventor of the present application, and by reference to the Kirk-Othmer "Encyclopedia of Chemical Technology," 2nd Ed., vol. 5 (1964), pp. 690–716, under the section "Coatings, Industrial," and vol. 9 (1966), pp. 286–315, under the sections "Fire Preventing and Extinction" and "Fire-Resistant Textiles," particularly pp. 303–310.

According to U.S. Pats. 3,184,371 and 3,261,894, an intermediate product is produced for use in molded shapes by:

(a) forming a solution containing in parts by weight about 1 part alkali metal silicate wherein the mole ratio of $Na_2O:SiO_2$ is 1:2.5 to 1:4.5, 0.02 to 0.7 parts of inorganic fibrous silicate and 2–10 parts of water;
(b) heating the solution to about 140–360° C. to drive off any free water phase; and
(c) comminuting the dried mixture to obtain an intermediate product having particles of 0.1 to 10 mm.

The patents of Seidl also disclose the use of particular inorganic and organic gas producing foaming agents.

Suitable inorganic gas producing foaming agents include carbonates of the alkaline earths, barium hydroxide, strontium hydroxide, manganese dioxide or lead dioxide.

The organic gas producing foaming agents include carbon black, glycols, glycerol, saccharides and starch.

It is known that combustible materials, especially wood, textiles, paper, cardboard, straw and the like can be rendered less readily ignitable and more difficultly burnable by treating them with flame and fire resisting substances. In case of a fire, such substances are supposed to retard the spread of flames and thereby greatly diminish the danger to persons and equipment.

Such fireproofing substances generally consist of solid or liquid chemical compounds or mixtures of compounds which are applied by impregnation, spraying, painting, troweling, immersing or the like, to the surface of the materials to be protected. The compounds can also penetrate more or less deeply into the interiors.

The usual fire resisting substances may be divided generally into three groups, according to their method of functioning:

(1) materials which carry heat away from fire so as to cool the object and keep it below its kindling temperature. Such materials consist mainly of those which contain water of crystallization and hygroscopic substances;
(2) materials which when heated generate non-combustible, air-displacing and fire-smothering gases such as carbon dioxide, ammonia, nitrogen, etc.;
(3) materials which produce and impervious protective layer which can be massive or foamy, or at higher temperatures a melt which will keep the air away from the surface to be protected. Such materials include waterglass and foamable coating materials.

SUMMARY OF THE INVENTION

According to the present invention, fibrous siliceous material such as rock wool, glass wool, basalt wool and the like, or finely powdered natural or synthetic products of similar composition, such as powdered basalt, powdered stone, blast furnace-, phosphate- or similar slag, is dissolved in a solution with alkali metal silicates and gas generating foaming agents as disclosed in U.S. Pats. 3,184,-371 and 3,261,894. The solution is evaporated to dryness and the resulting residue, preferably in powdered form, having a particle size below 1 mm. (1–50$\mu$) is used as a filler for fire resisting paints and surfacing materials. The process is also modified by chemicals to modify the melting point, the viscosity of the fused material, the water proofness, etc. The melting point is lowered by the addition of a total of 3 to 15 percent, and singly 0.5–8 percent by weight based on the weight of alkali metal silicate and inorganic fibrous silicate, or finely powdered silicate of lead or boron compounds to the aqueous silicate solution. An addition of a total of 3 to 15 percent, and singly 0.5–8 percent by weight of barium, strontium, calcium, aluminum gallium, idium, thallium, scandium or yttrium compounds raises the melting point.

The lead or boron compounds useful for addition to the aqueous silicate solution which lower the melting point of the fireproofing agents include the lead oxides PbO, $PbO_2$ and $Pb_3O_4$, and as boron compounds borax and other borates.

As examples of the compounds for addition to the aqueous silicate solution to raise the melting point of the fireproofing agents are the alkaline earth compounds and the elements of Group III of the Periodic Table, such as aluminum and the like, preferably in the form of their oxides. Suitable compounds for raising the melting point include barium carbonate, barium oxide, barium peroxide, barium phosphate, barium metasilicate, barium sulfate, strontium carbonate, strontium chromate, strontium hydroxide, strontium oxide, strontium peroxide, strontium metasilicate, calcium carbonate, calcium hydroxide, calcium peroxide, calcium phosphate, calcium metasilicate, aluminum oxide, gallium hydroxide, gallium oxide, indium hydroxide, indium oxide, thallium carbonate, thallium hydroxide, thallium oxide, thallium phosphate, scandium hydroxide, scandium oxide, yttrium hydroxide and yttrium oxide.

The amount of the fibrous siliceous material relative to the alkali silicate should be in the range of 0.02 to 0.8:1 parts by weight. In a water diluted alkali silicate solution the fibrous silicate will go into solution easily at temperatures below 100° C. Instead of fibrous silicates, powdered silicates and/or oxides are useful in the same proportions, being brought into solution in the alkali silicate solution by grinding, pumping or other refining methods.

As foaming agents, inorganic materials such as alkalin earth carbonates, barium or strontium hydroxide, manganese dioxide or lead dioxide are useful according to U.S. Pat. 3,184,371, or organic reducing agents, especially polyalcohols such as glycols, glycerol, saccharides and starch according to U.S. Pat. 3,261,894. The amount of organic foaming agent is chosen in such a manner that in the dried end product there will be 0.01 to 2 percent by weight carbon, preferably 0.05 to 0.5 percent. With an inorganic foaming material, as for example $CaCO_3$, an addition of 0.1 to 4 percent by weight is suitable.

After the reaction product has been evaporated to dryness, which can be done for example, on a roller drier or by means of spray driers, it is advantageous to warm the material to temperatures between 100 and 350° C., preferably to 120–250° C., in order to reduce the chemically bound residual water to amounts of 3–30 percent by weight, and preferably to 7–20 percent.

The production of flame and fire resisting materials from the fireproofing agents is accomplished in many ways. To produce paints or paintable materials, the simplest procedure is to mix the fireproofing agents of this invention as a filler or pigment to the conventional natural or synthetic paint binder which consists preferably of an aqueous solution, dispersion or emulsion.

The natural paint binders include casein, egg albumin, glues, gelatin, alginates, waterglass, etc. The synthetic paint binders include polyvinyl acetate, polyvinyl propionate, polyvinyl alcohol, butadiene-styrene dispersions, latex, etc.

To the mixture of paint binder and fireproofing agents can be added color pigments of all kinds, fillers such as chalk, titanium dioxide, $Al_2O_3$, powdered slate, sand, powdered glass and the like, as well as known fire resisting substances, for example, inorganic phosphates.

The ratio of binder to fire retardant pigment cannot be restricted with reference to its fireproofing action. For economic reasons, high proportions of binder are prohibited. By diminishing the proportion of binder, the hardness of the coating is diminished. If, for example, a polyvinyl acetate dispersion is used as the binder, the weight ratio binder/filler is generally 1:1 to 1:10 and preferably between 1:1 and 1:8. The most suitable ratio is determined by the specific intended uses and is in proportion to the amounts generally used. As for example, among the inorganic phosphates that are to be used, mono- and di-ammonium phosphate, calcium phosphate, magnesium phosphate, etc. are mentioned.

In a similar manner surfacing materials to be troweled on can be produced, the use of which is desirable when thicker fire resisting layers are desired, which are also produced when materials are used which have a consistency greater than paints but less than troweling materials and which can be sprayed on in several layers as mortars.

As surfacing materials, highly filled, or less often water-containing materials are understood, which are of such pasty consistency that they can no longer be applied as paints but have to be applied with a spatula or trowel. With a medium or lesser consistency, they can be applied by spraying. Their compositions are similar to those of the known surfacing materials. They differ therefrom only in that the fireproofing material of this invention in a large measure serves as a substituted for the usual fillers.

If layers several millimeters to a few centimeters thick are to be built up, as for example for the production of iron supporting structures in fire threatened buildings such as chemical manufacturing plants, mineral oil refineries and the like, reinforcing fabrics of glass cloth, woven asbestos or wire mesh can be used.

Another feature of this invention is that the modified substances and foaming agents are admixed partly or entirely in the solid state.

The surfacing agents and mortars of the present invention are reinforced by the insertion of materials such as mattings, binding tapes, and fabrics of metal, glass fiber and asbestos. These reinforcing materials are wrapped around the material to be protected. They are not fillers but serve rather as reinforcements whose purpose is to bring the fire resisting material to the material to be protected while shutting off hollow spaces to the outside, as for example in the case of a double T-carrier.

The fire retardant pigments of the present invention differ from the products of U.S. Pats. 3,184,371 and 3,261,894 in that the fire retardant pigments are not foamed until they are exposed to a fire. This exposure, in the case of a fire, causes the foaming of the fire retardant pigmented surface to produce an insulation barrier.

DESCRIPTION OF THE PREFERRED EMBODIMENTS

The fibrous inorganic silicates useful in the present invention include those silicates that are found either naturally in the fibrous state, or can be converted to the fibrous state by mechanical procedures. Examples of inorganic fibrous silicates include glass wool, basalt wool, rock wool and asbestos wool.

The alkali metal silicates include sodium, potassium and lithium silicates, but it is preferred to use the sodium silicate, particularly in a commercial solution thereof. Although it is possible to maintain the ratio of the alkali metal silicate to fibrous silicate to water of about 1:0.02:10 in parts by weight, it is preferable to maintain the ratio at about 1:0.15:5, and for even better results, from 1:0.3:4. It is also apparent that higher amounts of water can be used, inasmuch as the free water is evaporated in the next step.

The densities of the fireproofing agents are reduced by employing blowing agents, both inorganic and organic.

Lower densities are obtained by the addition of organic water-soluble materials to the alkali silicate solutions, which solutions in general, contain residual sulfates from their production from sand and sodium sulfate. The function of these organic water-soluble agents is to provide carbon to reduce the sulfate to hydrogen sulfide gas, which in turn swells the viscous mass, thereby providing a more porous material.

Of the enumerable possible water-soluble organic compounds that can be employed, particular success has been achieved with glycols, glycerol, sucrose and starch. These water-soluble substances are preferably admixed with the alkali silicate solutions in such concentrations that the carbon introduced amounts to about 0.01 to 2.0 percent, perferably 0.05 to 0.5 percent. The proportions of the final product of this employment of the invention are excellent, in that the densities are on the order of 0.05–0.15 gram per cubic centimeter.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

A preliminary solution was prepared from 1 liter alkali silicate solution (32% potassium silicate solution) and 3 grams of crystallized sucrose dissolved in 40 cubic centimeters of water. 150 grams of rock wool in 1 liter of this aqueous preliminary solution were thereafter mixed with 0.7 liter of water. The rock wool was completely dissolved by heating and the solution was then evaporated in an iron vessel for 6 hours at 300° C. The solid residue was removed after cooling and crushed in a conventional grinder to a maximum particle size of 1 mm.

EXAMPLE 2

A preliminary solution was prepared from 1 liter of an aqueous commercial sodium silicate solution (37%) by dissolving therein 5 grams of glycerin. 150 grams of rock wool and 1 liter of this aqueous solution were thereafter mixed with 0.7 liter of water. The rock wool was completely dissolved by heating and then the solution was evaporated in an iron vessel for 6 hours at 300° C. The solid residue was removed after cooling, and crushed in a conventional grinder to a maximum particle size of 1 mm.

EXAMPLE 3

To the solution of 150 grams of rock wool in one liter of alkali silicate solution of Example 1 were added 25 grams of borax to lower the melting point of the fireproofing filler. The material was processed as in Example 1.

EXAMPLE 4

To the solution of 150 grams of rock wool in one liter of alkali silicate solution of Example 1 were added 25 grams of hydrated aluminum oxide to increase the melting point of the fireproofing filler. The material was processed as in Example 1.

EXAMPLE 5

A commercial emulsion paint binder based on polyvinyl acetate having a solids percentage by weight of 54–56, viscosity of 200–4500 cps., pH of 4–6, residual vinyl acetate monomer of less than 1.0–0.3, particle size of 0.2–3.0μ and a density at 25° C. of 9.2 lbs./gallon is mixed with 5 percent powdered chalk and enough of the product of Example 1 that a plastic mass is formed (wt. ratio binder/filler between 1:1 and 1:8). When the polyvinyl acetate binder is in the lower range of 200 cps. viscosity no water addition is necessary, but with the higher viscosity of 4500 cps. water must be added. When water is added it is also necessary to add an emulsifier such as polyvinyl alcohol. When the binder is of brittling consistency, the addition of a softener is useful. It is coated upon wood in a layer 3 mm. thick. For comparison, a similar surfacing material is used which contains only chalk as the filler and is coated upon wood in a layer of the same thickness. After drying, the sample pieces are flame treated with a welding torch. When the control piece is flame treated the coating blisters off and the wood ignites after 5 minutes and burns up, whereas in all samples coated with this new material, the coating only foams and forms an insulating layer three to five times its original thickness. After about 15 minutes of flame treatment with a welding torch, the wood is still unaffected. After continued flame treatment, the foamed material begins to sinter together, with gradual charring of the wood. Even after prolonged flame treatment with the welding torch, up to 30 minutes, the wood does not ignite.

EXAMPLE 6

Example 5 is repeated with the fireproofing filler of Example 2 and with comparable results.

EXAMPLE 7

Example 5 is repeated with the fireproofing filler of Example 3 and with comparable results.

EXAMPLE 8

Example 5 is repeated with the fireproofing filler of Example 4 and with comparable results.

EXAMPLE 9

Example 5 is repeated with "Acryloid A-21" of Rohm & Haas Co. substituted for the polyvinyl acetate binder. "Acryloid A-21" is 30 percent emulsion of methyl methacrylate. The flame treatment produced results comparable to those of Example 5.

EXAMPLE 10

Example 5 is repeated with "Hycar 1577" substituted for the polyvinyl acetate binder. "Hycar 1577" is a butadiene-acrylonitrile copolymer latex having a pH of 9.5, an average particle size of 400 angstroms and a 35 percent solids content. The flame treatment produces results comparable to those of Example 5.

EXAMPLE 11

Example 5 is repeated with the maleinized tall oil fatty acid solution of Example 1 of U.S. Pat. 3,308,077 substituted for the polyvinyl acetate binder. The flame treatment produces results comparable to those of Example 5.

EXAMPLE 12

Example 5 is repeated with the baking enamel containing melamine-formaldehyde resin composition of Example 5 of U.S. Pat. 3,308,077 substituted for the polyvinyl acetate binder. The composition was sprayed on the wood base and baked thereon for one hour at 300° F. The flame treatment produces results comparable to those of Example 5.

EXAMPLE 13

A double T carrier is coated with a sprayable surfacing material prepared by diluting the fire resistant composition of Example 5. A bandage of asbestos is then wrapped around the T carrier in such a manner that a column of rectangular cross-section is produced in which the profile space of the carrier remains as an air space. The bandage is sprayed with a layer of the new surfacing material 2 mm. thick, then again wrapped with wire mesh or asbestos bandage and again sprayed. After drying a conventional decorative coating is applied. A carrier that is protected in this manner is just as resistant to fire as one that has been surrounded by cement.

We claim:
1. In the method of preparing a coating composition comprising a fireproofing filler and a paint binder, the improvement comprising:
   (a) forming an aqueous solution containing in parts by weight about 1 part alkali metal silicate, wherein the mole ratio of $Na_2O:SiO_2$ is 1:2.5 to 4.5, and 0.02 to 0.8 parts of inorganic fibrous silicate or finely powdered silicate;
   (b) heating said solution to about 140–360° C. to drive off any free water phase to obtain a dried mixture;
   (c) comminuting said dried mixture to obtain said fireproofing filler having a particle size of less than 1 mm.; and
   (d) adding a fire retardant amount of said fireproofing filler to said binder whereby in the event of a fire said fireproofing filler is foamed by exposure to said fire to produce an insulation barrier.

2. The method of claim 1, further comprising the addition to the aqueous silicate solution of about 0.1 to 4 percent by weight, based on the weight of alkali metal silicate and inorganic fibrous silicate or finely powdered silicate, of an inorganic compound for producing foaming gas selected from the group consisting of carbonates of the alkaline earths, barium hydroxide, strontium hydroxide, manganese dioxide or lead dioxide.

3. The method of claim 1, further comprising the addition to the aqueous silicate solution of about 0.01 to 2 percent by weight carbon, based on the weight of alkali metal silicate and inorganic fibrous silicate or finely powdered silicate, of an organic foaming agent selected from the group consisting of glycerol, sucrose and starch.

4. The method of claim 2, further comprising the addition to the aqueous silicate solution of an inorganic member selected from the group consisting of lead or boron compounds in a weight percent of a total of about 3–15 based on the weight of alkali metal silicate and inorganic fibrous silicate or finely powdered silicate to lower the melting point of the fireproofing filler.

5. The method of claim 3, further comprising the addition to the aqueous silicate solution of an inorganic member selected from the group consisting of lead or boron compounds in a weight percent of a total of about 3–15 based on the weight of alkali metal silicate and inorganic fibrous silicate or finely powdered silicate to lower the melting point of the fireproofing filler.

6. The method of claim 2, further comprising the addition to the aqueous silicate solution of an inorganic member selected from the group consisting of barium, strontium, calcium, aluminum, gallium, indium, thallium, scandium or yttrium compounds in a weight percentage of a total of about 3–15 based on the weight of alkali metal silicate and inorganic fibrous silicate or finely powdered silicate to increase the melting point of the fireproofing filler.

7. The method of claim 3, further comprising the addition to the aqueous silicate solution of an inorganic member selected from the group consisting of barium, strontium, calcium, aluminum, gallium, indium, thallium, scandium or yttrium compounds in a weight percentage of a total of about 3–15 based on the weight of alkali metal silicate and inorganic fibrous silicate or finely powdered silicate to increase the melting point of the fireproofing filler.

8. The method of claim 2, further comprising the addition to the aqueous silicate solution of an inorganic member selected from the group consisting of lead or boron compounds in a weight percent of singly about 0.5–8 based on the weight of alkali metal silicate and inorganic fibrous silicate or finely powdered silicate to lower the melting point of the fireproofing filler.

9. The method of claim 3, further comprising the addition to the aqueous silicate solution of an inorganic member selected from the group consisting of lead or boron compounds in a weight percent of singly about 0.5–8 based on the weight of alkali metal silicate and inorganic fibrous silicate or finely powdered silicate to lower the melting point of the fireproofing filler.

10. The method of claim 2, further comprising the addition to the aqueous silicate solution of an inorganic member selected from the group consisting of barium, strontium, calcium, aluminum, gallium, indium, thallium, scandium or yttrium compounds in a weight percentage of singly about 0.5–8 based on the weight of alkali metal silicate and inorganic fibrous silicate or finely powdered silicate to increase the melting point of the fireproofing filler.

11. The method of claim 3, further comprising the addition to the aqueous silicate solution of an inorganic member selected from the group consisting of barium, strontium, calcium, aluminum, gallium, indium, thallium, scandium or yttrium compounds in a weight percentage of singly about 0.5–8 based on the weight of alkali metal silicate and inorganic fibrous silicate or finely powdered silicate to increase the melting point of the fireproofing filler.

12. The fireproofing composition obtained by the method of claim 1, wherein the weight ratio of binders to fillers is about 1:1 to 1:10.

References Cited

UNITED STATES PATENTS

| | | | |
|---|---|---|---|
| 2,429,957 | 10/1947 | Cagnina et al. | 106—15 X |
| 3,033,700 | 5/1962 | Buckman et al. | 106—84 X |
| 3,095,312 | 6/1963 | Holmes | 106—75 |
| 3,184,371 | 5/1965 | Seidl | 161—193 |
| 3,261,894 | 7/1966 | Seidl | 264—43 |
| 3,311,585 | 3/1967 | Edlin | 106—15 X |
| 3,416,939 | 12/1968 | Schutt et al. | 106—84 |

JOAN B. EVANS, Primary Examiner

U.S. Cl. X.R.

106—75, 79, 84, 204, 214